United States Patent
Wu

(10) Patent No.: US 9,327,636 B2
(45) Date of Patent: May 3, 2016

(54) VEHICLE LIGHT APPARATUS

(71) Applicant: COPLUS INC., Tainan (TW)

(72) Inventor: Jacob Wu, Tainan (TW)

(73) Assignee: Coplus Inc., Tainan (TW)

( * ) Notice: Subject to any disclaimer, the term of this patent is extended or adjusted under 35 U.S.C. 154(b) by 11 days.

(21) Appl. No.: 14/153,603

(22) Filed: Jan. 13, 2014

(65) Prior Publication Data

US 2015/0049504 A1 Feb. 19, 2015

(30) Foreign Application Priority Data

Aug. 16, 2013 (TW) .............................. 102129491 A
Sep. 11, 2013 (TW) .............................. 102217081 A

(51) Int. Cl.
| | |
|---|---|
| *F21V 7/00* | (2006.01) |
| *B60Q 1/04* | (2006.01) |
| *B60Q 1/00* | (2006.01) |
| *B60Q 1/14* | (2006.01) |
| *B60Q 1/38* | (2006.01) |
| *F21S 8/10* | (2006.01) |

(52) U.S. Cl.
CPC ................ *B60Q 1/04* (2013.01); *B60Q 1/0041* (2013.01); *B60Q 1/0052* (2013.01); *B60Q 1/1423* (2013.01); *B60Q 1/38* (2013.01); *F21S 48/1104* (2013.01); *F21S 48/1154* (2013.01); *F21S 48/1266* (2013.01); *F21S 48/1275* (2013.01); *F21S 48/1747* (2013.01); *F21S 48/211* (2013.01); *F21S 48/215* (2013.01); *F21S 48/2212* (2013.01); *F21S 48/24* (2013.01); *B60Q 2300/142* (2013.01); *B60Q 2400/30* (2013.01); *F21S 48/328* (2013.01)

(58) Field of Classification Search
CPC .. B60Q 1/0041; B60Q 1/0047; B60Q 1/0052; B60Q 1/04; F21S 48/1154; F21S 48/1341; F21S 48/1376; F21S 48/1382; F21S 48/1394; F21S 48/10; F21S 48/215
USPC .................................. 362/517, 297, 516, 518
See application file for complete search history.

(56) References Cited

U.S. PATENT DOCUMENTS

| | | | | |
|---|---|---|---|---|
| 5,667,295 | A * | 9/1997 | Tsui ......................... | 362/249.15 |
| 6,619,825 | B2 * | 9/2003 | Natsume ....................... | 362/509 |
| 6,796,680 | B1 * | 9/2004 | Showers et al. ............... | 362/246 |
| 6,969,179 | B2 * | 11/2005 | Sloan et al. .................... | 362/219 |
| 7,101,056 | B2 * | 9/2006 | Pare ............................... | 362/190 |
| 7,357,546 | B2 * | 4/2008 | Ishida et al. ................... | 362/545 |
| 7,993,045 | B2 * | 8/2011 | Nakamura et al. ............ | 362/545 |
| 8,556,452 | B2 * | 10/2013 | Simon et al. ............. | 362/217.07 |
| 8,721,142 | B2 * | 5/2014 | Lambert et al. ............... | 362/511 |
| 2003/0156410 | A1 * | 8/2003 | Ter-Hovhannisian ........ | 362/241 |
| 2004/0218399 | A1 * | 11/2004 | Lin ................................ | 362/509 |
| 2007/0058357 | A1 * | 3/2007 | Yamaguchi et al. ............ | 362/84 |
| 2007/0183164 | A1 * | 8/2007 | Naganawa et al. ............ | 362/507 |
| 2008/0247188 | A1 * | 10/2008 | Woodward ..................... | 362/554 |
| 2010/0020561 | A1 * | 1/2010 | An ................................. | 362/516 |

(Continued)

*Primary Examiner* — Elmito Breval
*Assistant Examiner* — Matthew Peerce
(74) *Attorney, Agent, or Firm* — Lewis Roca Rothgerber Christie LLP

(57) ABSTRACT

A vehicle light apparatus includes a low-beam headlight unit, and a composite headlight unit that includes a plurality of light-emitting modules and a control module. Each light-emitting module includes a high-beam light element and a turn signal light element. The control module is electrically coupled to the light-emitting modules and the low-beam headlight unit so as to simultaneously turn off the high-beam light elements and turn on the low-beam headlight unit when the turn signal light elements are switched on.

11 Claims, 12 Drawing Sheets

(56) References Cited

U.S. PATENT DOCUMENTS

| | | | |
|---|---|---|---|
| 2010/0290241 A1* | 11/2010 | Tsukamoto | 362/519 |
| 2012/0327677 A1* | 12/2012 | Furukawa et al. | 362/517 |
| 2013/0051045 A1* | 2/2013 | Kay | 362/478 |
| 2013/0114282 A1* | 5/2013 | Williams et al. | 362/518 |
| 2013/0215633 A1* | 8/2013 | Wuerthele et al. | 362/516 |
| 2015/0003053 A1* | 1/2015 | Ariyoshi et al. | 362/223 |
| 2015/0043236 A1* | 2/2015 | Yamamoto | 362/516 |
| 2015/0062890 A1* | 3/2015 | Camarota | 362/223 |

* cited by examiner

VEHICLE LIGHT APPARATUS

CROSS-REFERENCE TO RELATED APPLICATION

This application claims priority to Taiwanese Application Nos. 102129491 and 102217081, filed on Aug. 16, 2013 and Sep. 11, 2013, respectively.

BACKGROUND OF THE INVENTION

1. Field of the Invention

The invention relates to a vehicle light apparatus, more particularly to a vehicle light apparatus having a relatively small size and a control module for providing different light distribution patterns.

2. Description of the Related Art

Referring to FIG. 1, a conventional vehicle light apparatus 1 includes a light seat 11, an outer cover (not shown) that covers the light seat 11, a low-beam light element 12, a high-beam light element 13, a turn signal light element 14, and an auxiliary light set 15. The light seat 11 is horizontally formed with three spaced-apart light mounting holes 111. The low-beam, high-beam, and turn signal light elements 12, 13, 14 are respectively mounted in the light mounting holes 111. The turn signal light element 14 is situated in proximity to an external side of the light seat 11. The low-beam light element 12 is situated between the high-beam light element 13 and the turn signal light element 14. Moreover, the auxiliary light set 15 is arcuately arranged between two adjacent light mounting holes 111 that respectively receive the low-beam light element 12 and the turn signal light element 14, and further extends beneath the two adjacent light mounting holes 111 that respectively receive the low-beam light element 12 and the high-beam light element 13. The auxiliary light set 15 has a plurality of auxiliary light elements 151. Some of the auxiliary light elements 151 arcuately surround the low-beam light element 12. The remaining auxiliary light elements 151 horizontally extend beneath from the low-beam light element 12 to the high-beam light element 13.

In order to generate different light distribution patterns in compliance with relevant legal requirements and regulations, the conventional vehicle light apparatus 1 is necessitated to horizontally arrange the spaced-apart light mounting holes 111 on the light seat 11 and to respectively mount the low-beam light element 12, the high-beam light element 13 and the turn signal light element 14 in the light mounting holes 111. Since the horizontal arrangement of the low-beam, high-beam, and turn signal light elements 12, 13, 14 occupies relatively large space, the conventional vehicle light apparatus 1 may have an undesirably large size for arrangement of different light elements especially if the auxiliary light elements 151 are required for enhancing identifiability.

SUMMARY OF THE INVENTION

Therefore, an object of the present invention is to provide a vehicle light apparatus that can overcome the aforesaid drawbacks of the prior art.

According to the present invention, a vehicle light apparatus includes a main housing, a low-beam headlight unit and a composite headlight unit. The main housing has a receiving space. The low-beam headlight unit is mounted in the receiving space to provide a low-beam distribution pattern. The composite headlight unit includes a plurality of light-emitting modules that are mounted in the receiving space. Each of the light-emitting modules includes a high-beam light element and a turn signal light element. The high-beam light elements of the light-emitting modules provide a high-beam distribution pattern, and the turn signal light elements of the light-emitting modules provide a turn signal distribution pattern. The control module is electrically coupled to the light-emitting modules and the low-beam headlight unit so as to simultaneously turn off the high-beam light elements and turn on the low-beam headlight unit when the turn signal light elements are switched on.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
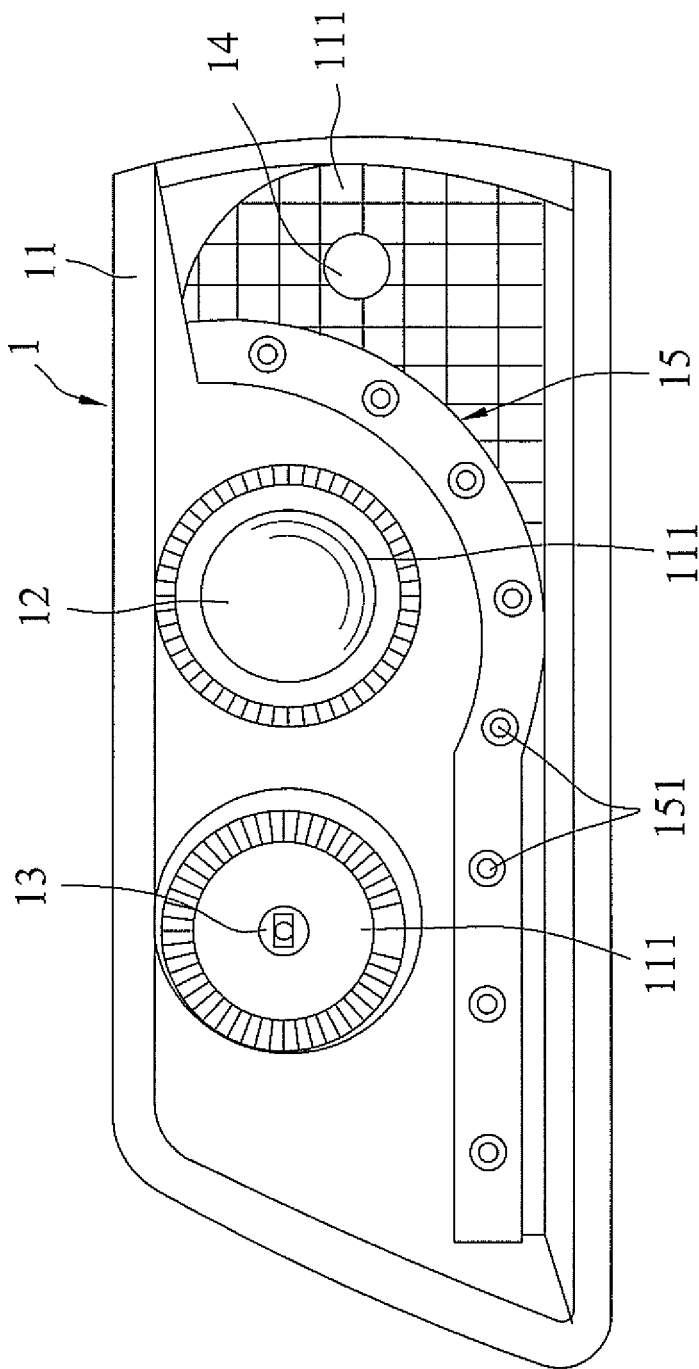
FIG. 1 is a front view, illustrating a conventional vehicle light apparatus.

Before the present invention is described in greater detail, it should be noted that like elements are denoted by the same reference numerals throughout the disclosure.

Figure 2:
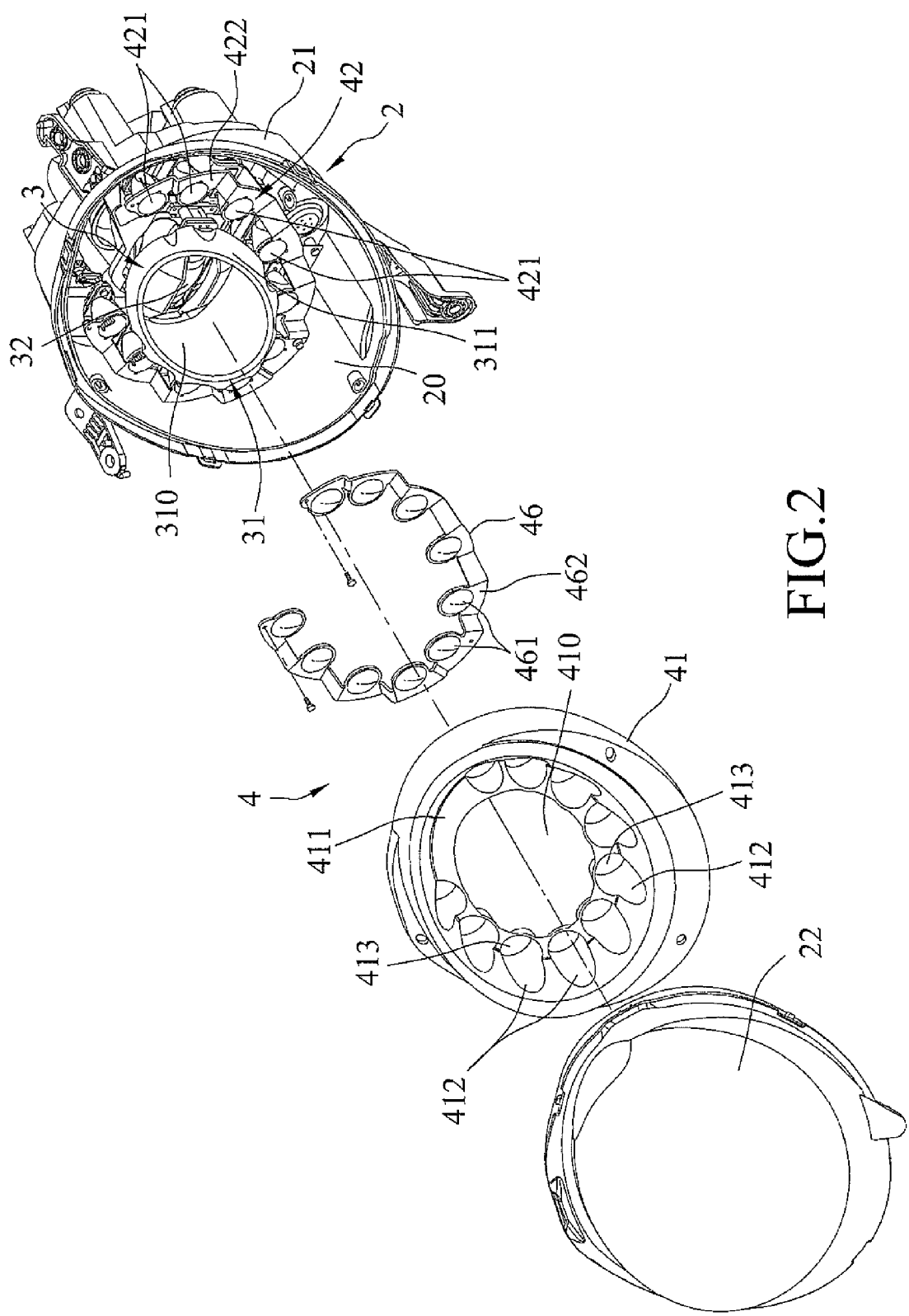
FIG. 2 is an exploded perspective view, illustrating the first preferred embodiment of a vehicle light apparatus according to the present invention.
Figure 3:
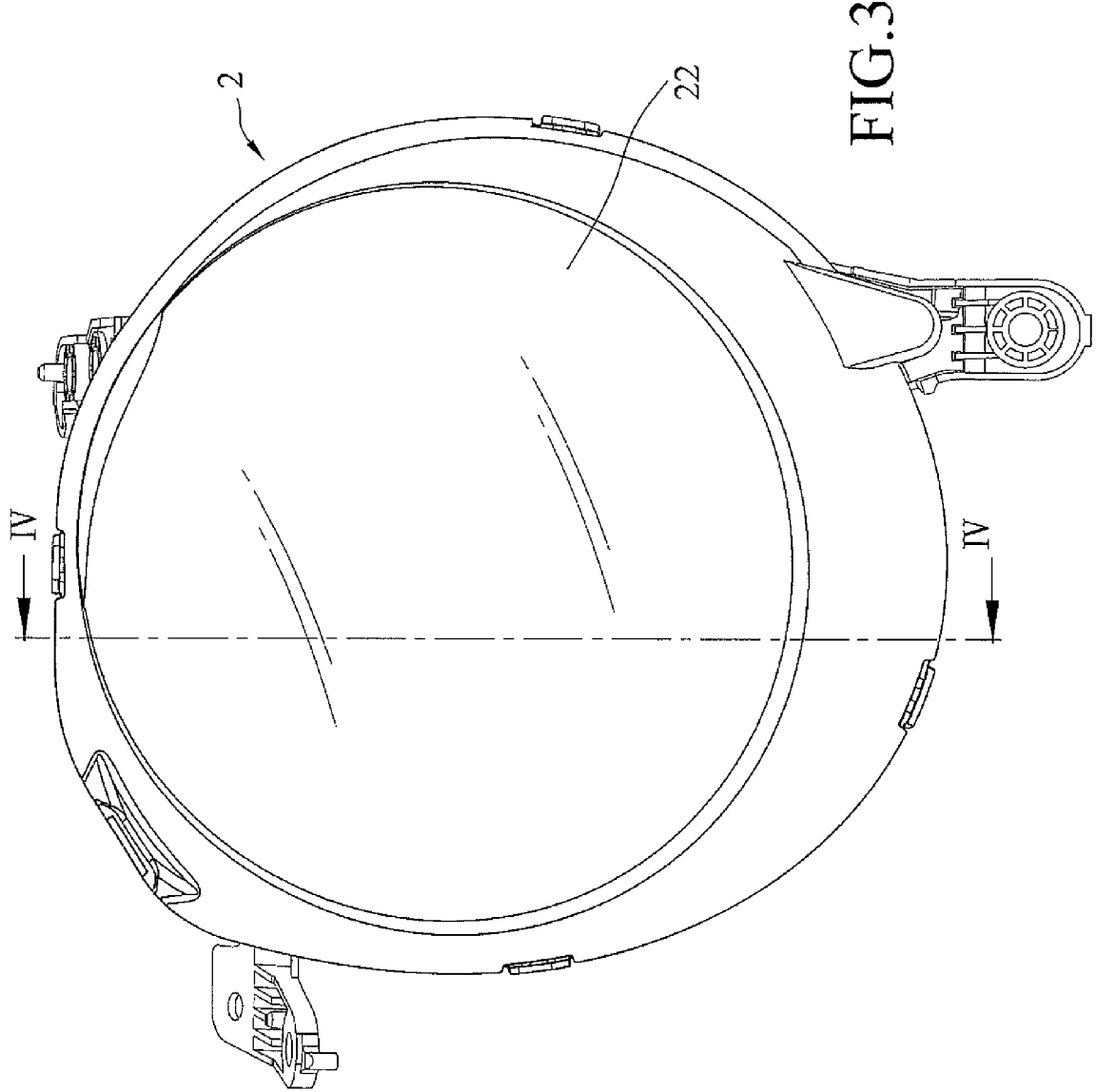
FIG. 3 is a front view of the first preferred embodiment.
Figure 4:
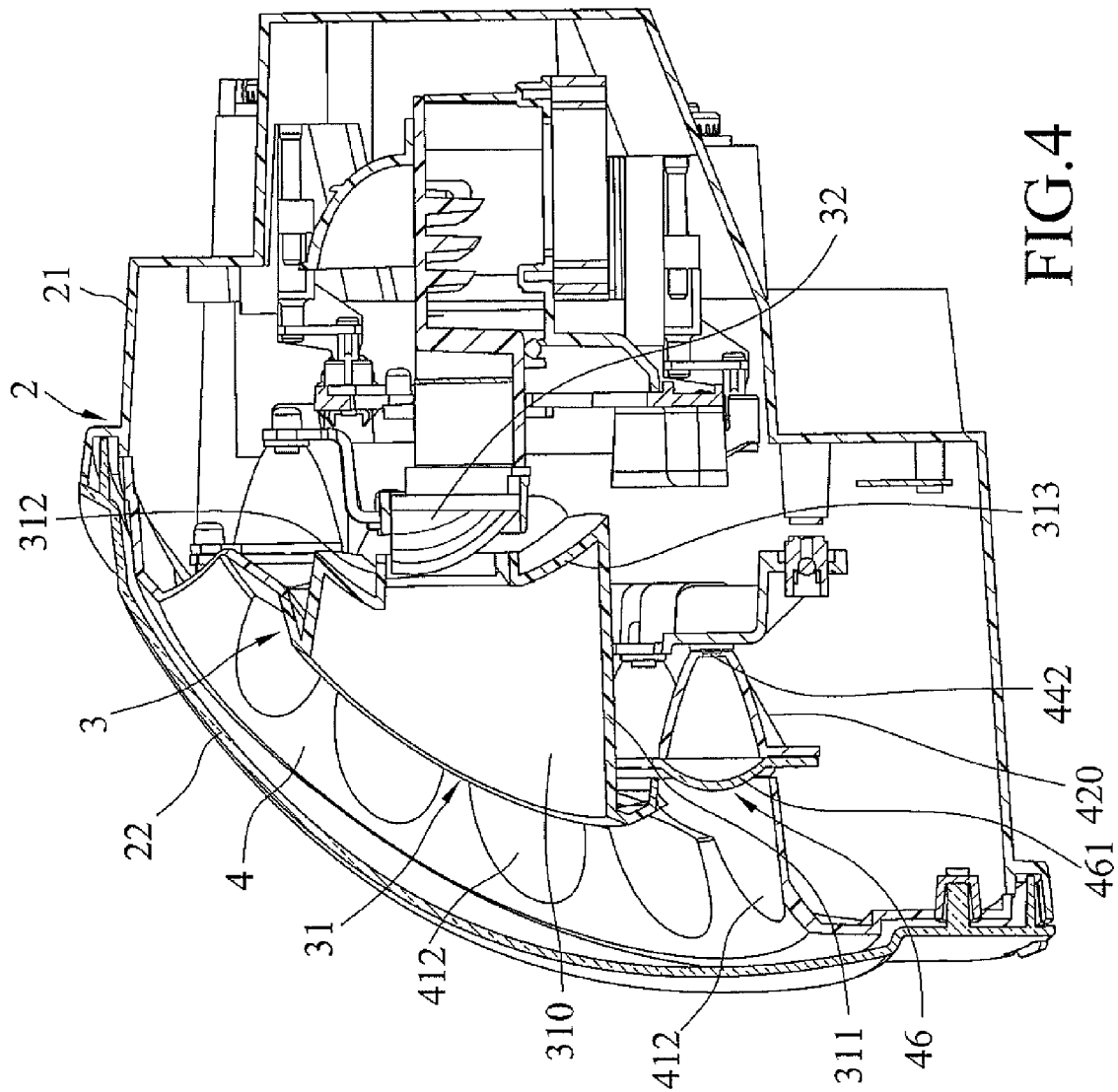
FIG. 4 is a sectional view of the first preferred embodiment taken along the line IV-IV of FIG. 3.
Figure 5:
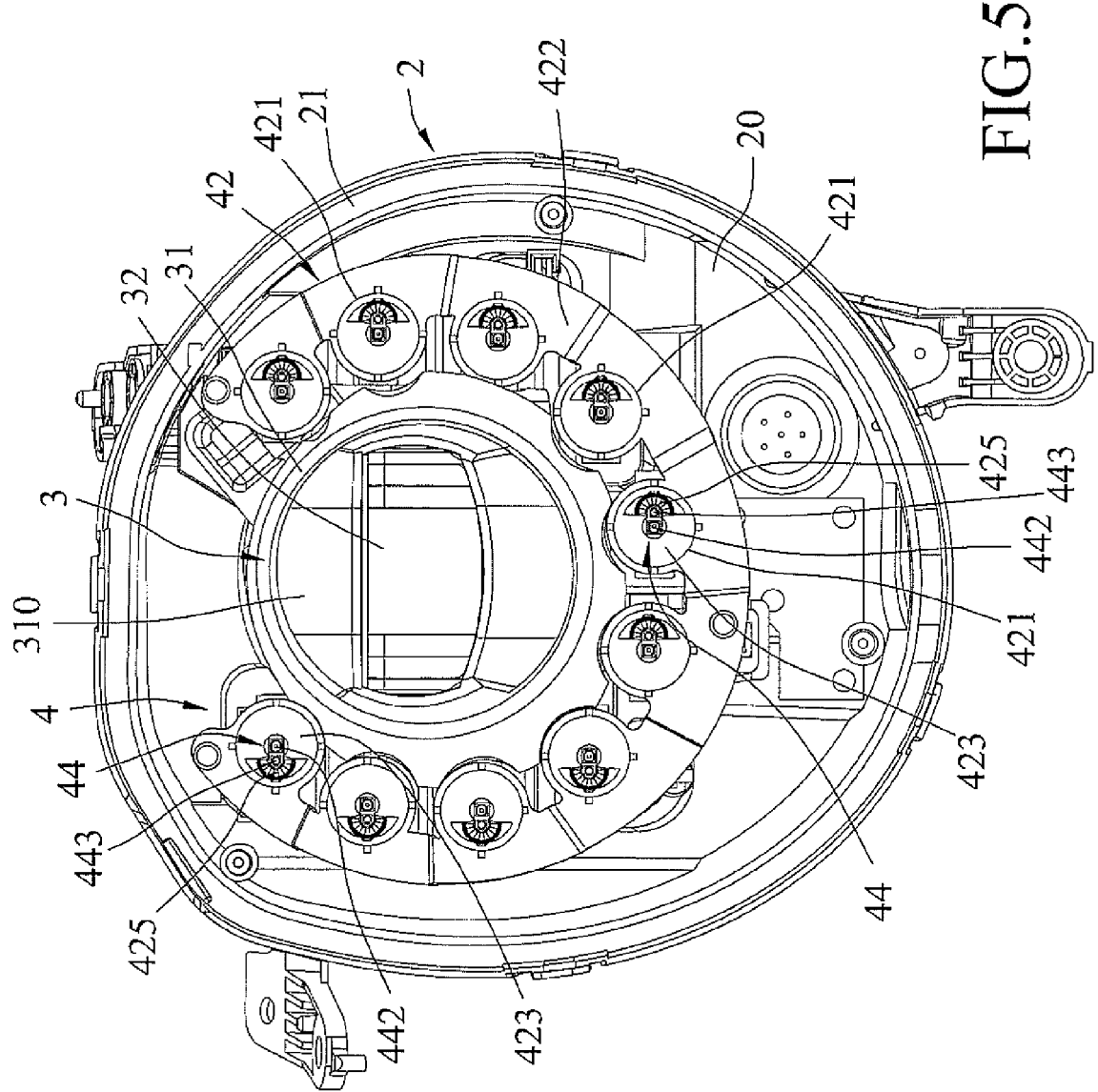
FIG. 5 is a fragmentary front view of the first preferred embodiment, illustrating a plurality of light-emitting modules around a low-beam headlight unit inside a main housing.

Referring to FIGS. 2 to 4, the first preferred embodiment of a vehicle light apparatus according to the present invention is illustrated. The vehicle light apparatus includes a main housing 2, and a low-beam headlight unit 3 and a composite headlight unit 4 disposed in the main housing 2. The low-beam headlight unit 3 and the composite headlight unit 4 are omitted from FIG. 3.

The main housing 2 has a receiving space 20. In this preferred embodiment, the main housing 2 further has a main housing body 21 that is adapted to be mounted on a vehicle (not shown) and a housing cover 22 that covers a front side of the main housing body 21. The main housing body 21 and the housing cover 22 cooperatively define the receiving space 20.

The low-beam headlight unit 3 is mounted in the receiving space 20 to provide a low-beam distribution pattern. In this preferred embodiment, the low-beam headlight unit 3 includes a low-beam reflector 31 and a low-beam light element 32. The low-beam reflector 31 has an annular reflective wall 311 that defines a reflective space 310 receiving the low beam light element 32. Preferably, the low-beam reflector 31 further has an inner annular wall 312 and a connection wall 313 that interconnects the annular reflective wall 311 and the inner annular wall 312. The low-beam light element 32 is aligned with the inner annular wall 312 and projects light into the reflective space 310, such that the low-beam reflector 31 reflects and distributes the light projected from the low-beam light element 32 in compliance with relative regulations. Since the feature of this invention does not reside in the configuration of the reflective space 310 and the low-beam light element 32, which may be readily appreciated by those skilled in the art, details of the same are omitted herein for the sake of brevity.

Referring to FIGS. 2, 5, 6 and 8, the composite headlight unit 4 includes a plurality of light-emitting modules 44 and a control module 45. The light-emitting modules 44 are mounted in the receiving space 20. Each of the light-emitting modules 44 includes a high-beam light element 442 and a turn signal light element 443. The high-beam light elements 442 of the light-emitting modules 44 provide a high-beam distribution pattern, and the turn signal light elements 443 of the light-emitting modules 44 provide a turn signal distribution pattern. The control module 45 is electrically coupled to the light-emitting modules 44 and the low-beam light element 32 of the low-beam headlight unit 3 so as to simultaneously turn off the high-beam light elements 442 and turn on the low-beam light element 32 when the turn signal light elements 443 are switched on. In this preferred embodiment, the light-emitting modules 44 surround the low-beam headlight unit 3. Each of the light-emitting modules 44 further includes a circuit board 441 that is disposed in the receiving space 20 and that is electrically coupled to the control module S. The high-beam and turn signal light elements 442, 493 are mounted on the circuit board 441.

Figure 6:
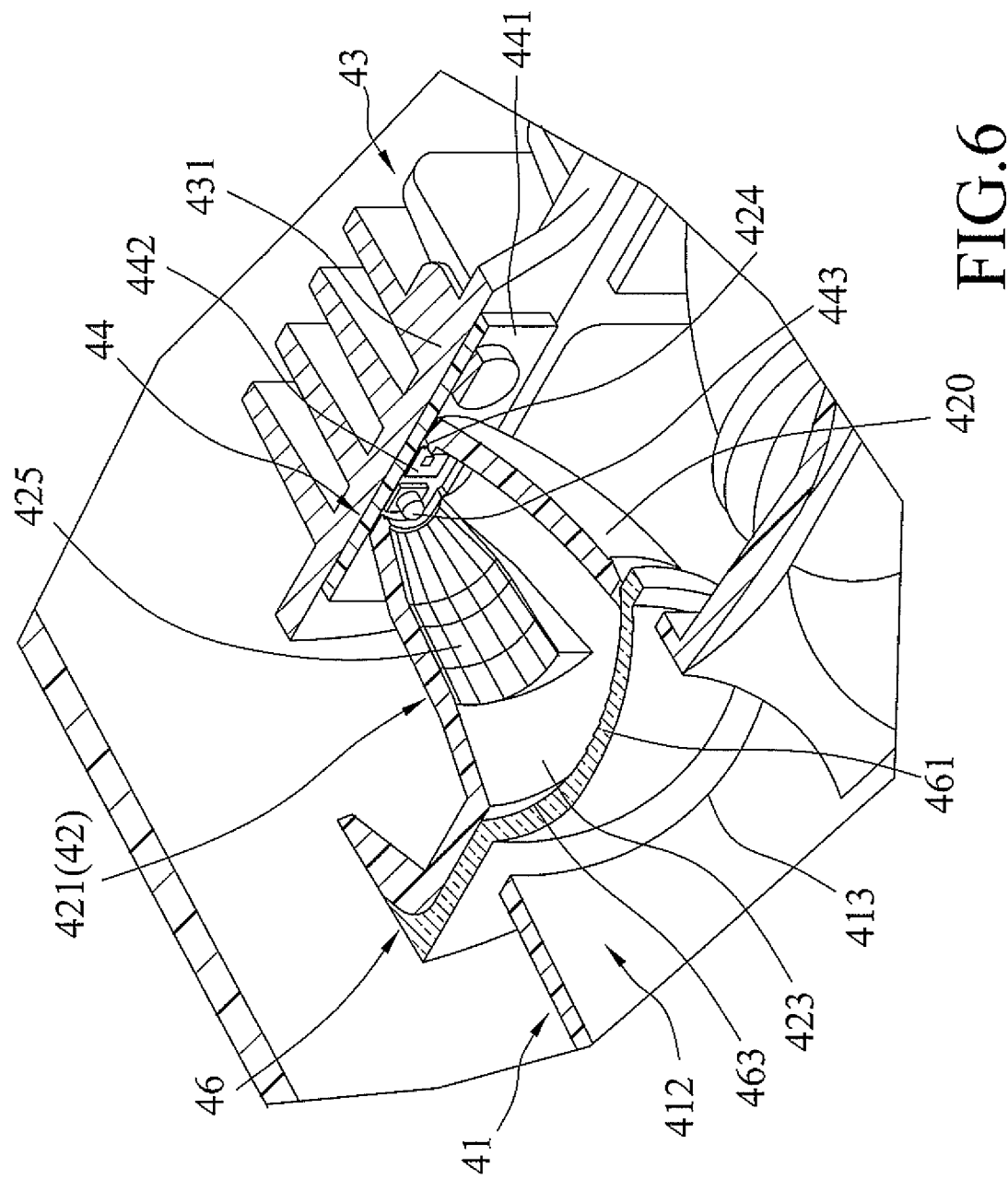
FIG. 6 is a fragmentary sectional view of the first preferred embodiment.

In this embodiment, the composite headlight unit 4 further includes a heat sink unit 43 that includes a plurality of heat dissipation members 431 (only one is shown in FIG. 6). The heat dissipation members 431 respectively contact the circuit boards 441 of the light emitting modules 44. Preferably, the composite headlight unit 4 further includes a light mounting seat 42 that has a plurality of reflector cups 421, and an annular reflection seat 41 that is disposed in front of the light mounting seat 42 and that has a plurality of light passages 412 which are respectively aligned with the reflector cups 421. In this preferred embodiment, the high-beam and turn signal light elements 442, 443 of each of the light-emitting modules 44 are disposed in a respective one of the reflector cups 421. Each of the reflector cups 421 has a cup wall 420 that has a front open end 423 proximate to the annular reflection seat 41, and a rear open end 424 distal from the annular reflection seat 41. The cup wall 420 tapers from the front open end 423 toward the rear open end 424. The high-beam and turn signal light elements 442, 443 of each of the light-emitting modules 44 are disposed in the rear open end 424 of a respective one of the reflector cups 421. Preferably, the high-beam light element 442 of each of the light-emitting modules 44 is disposed at a center of the rear open end 424 of the respective one of the reflector cups 421. The turn signal light element 443 of each of the light-emitting modules 44 is offset from the center of the rear open end 424. In addition, each of the reflector cups 421 of the light mounting seat 42 further has a reflector prism area 425 that protrudes from an inner surface of the cup wall 420 around the turn signal light element 443 of a respective one of the light-emitting modules 44. The reflector prism area 425 is enlarged from the rear open end 424 toward the front open end 423. In this preferred embodiment, the reflector prism area 425 has a sector-shaped inner surface. More preferably, the light mounting seat 42 of the composite headlight unit 4 further has a connection plate 422 that extends around the low-beam headlight unit 3 and that interconnects the reflector cups 421. In this preferred embodiment, the annular reflection seat 41 of the composite headlight unit 4 further has an annular body 411 that defines a hollow region 410. The light passages 412 surround the hollow region 410. The annular reflective wall 311 is aligned with the hollow region 410. Each of the light passages 412 has a rear opening 413 that is aligned with the front open end 423 of a respective one of the reflector cups 421. Preferably, each of the light passages 412 is enlarged forwardly from the rear opening 413.

Figure 7:
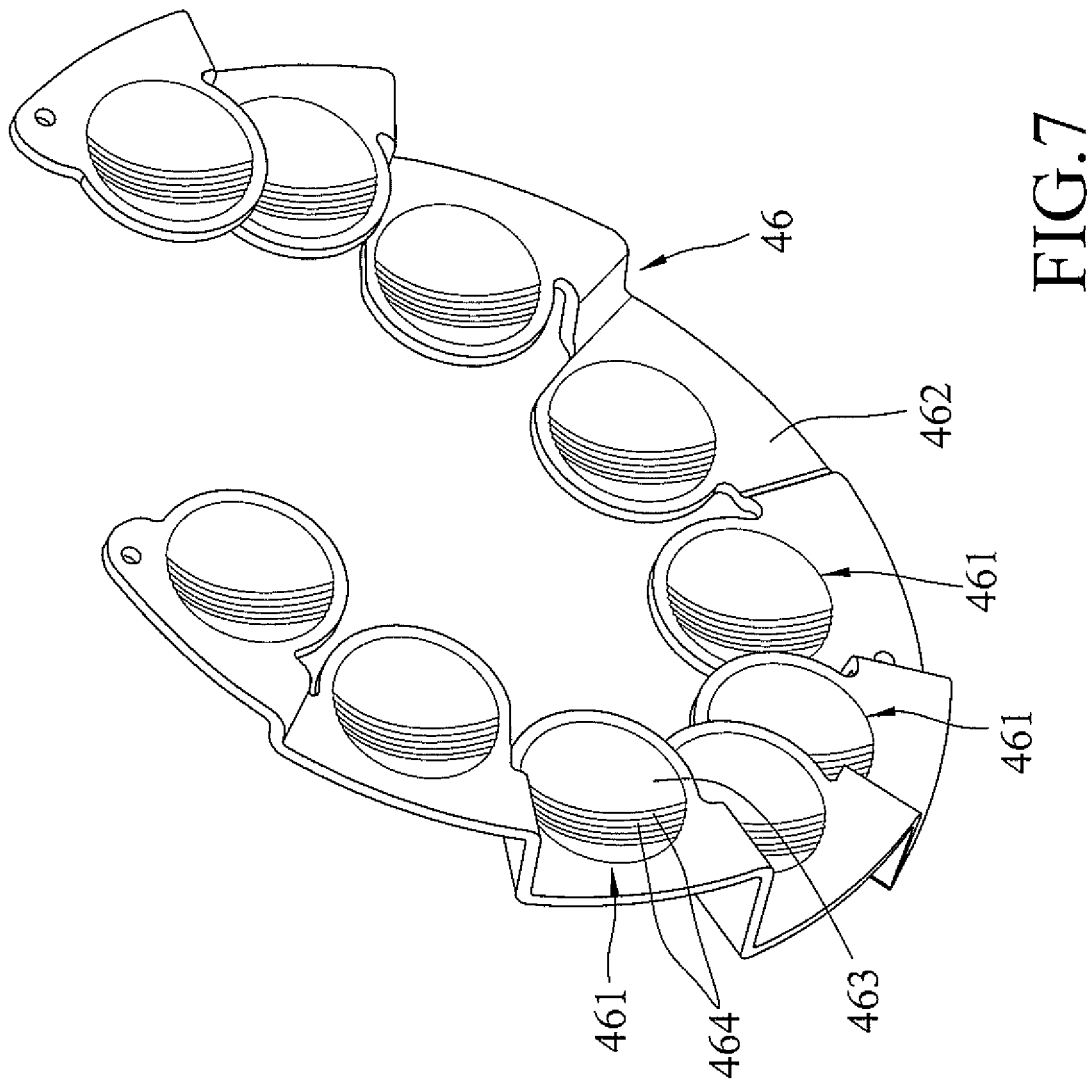
FIG. 7 is a rear perspective view of a lens member seat of the first preferred embodiment.
Figure 8:
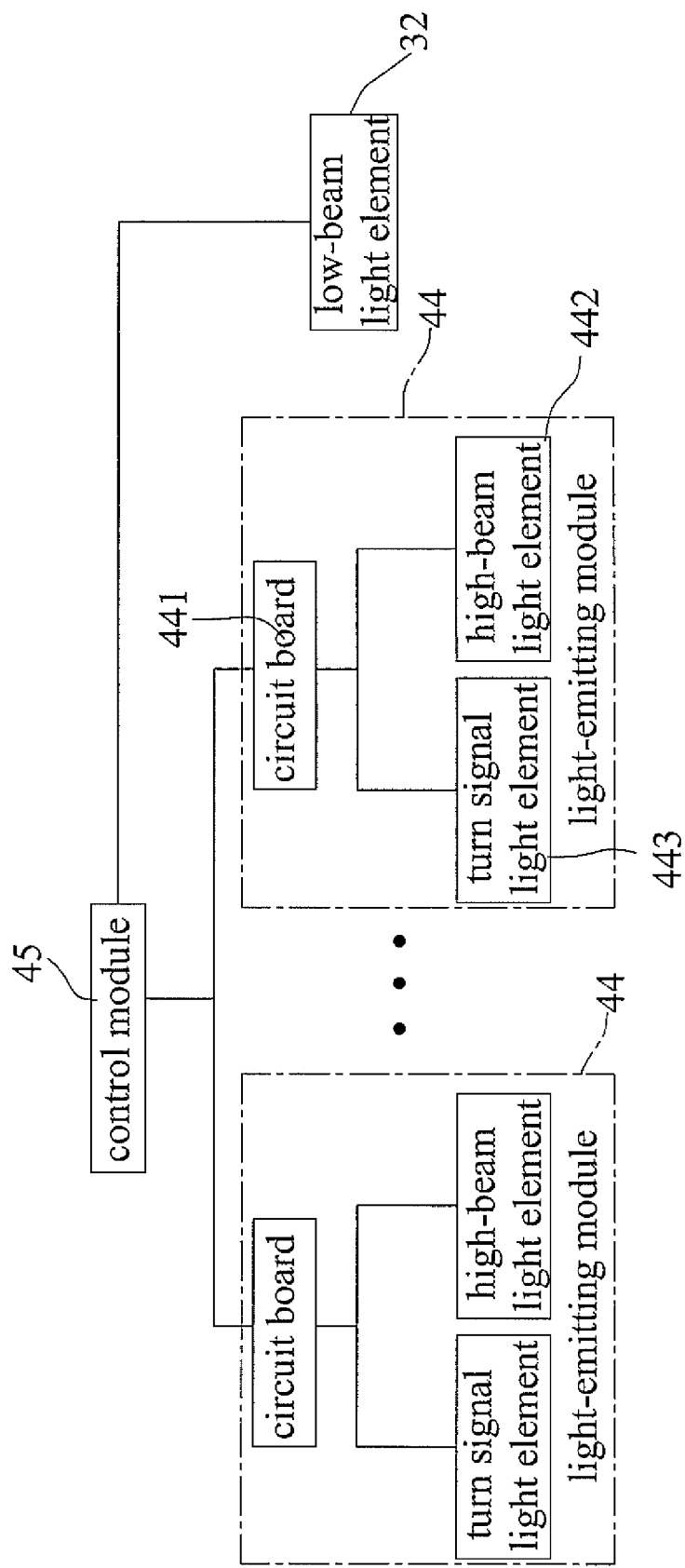
FIG. 8 is a schematic block diagram to illustrate operations of a control module of the first preferred embodiment.
Figure 9:
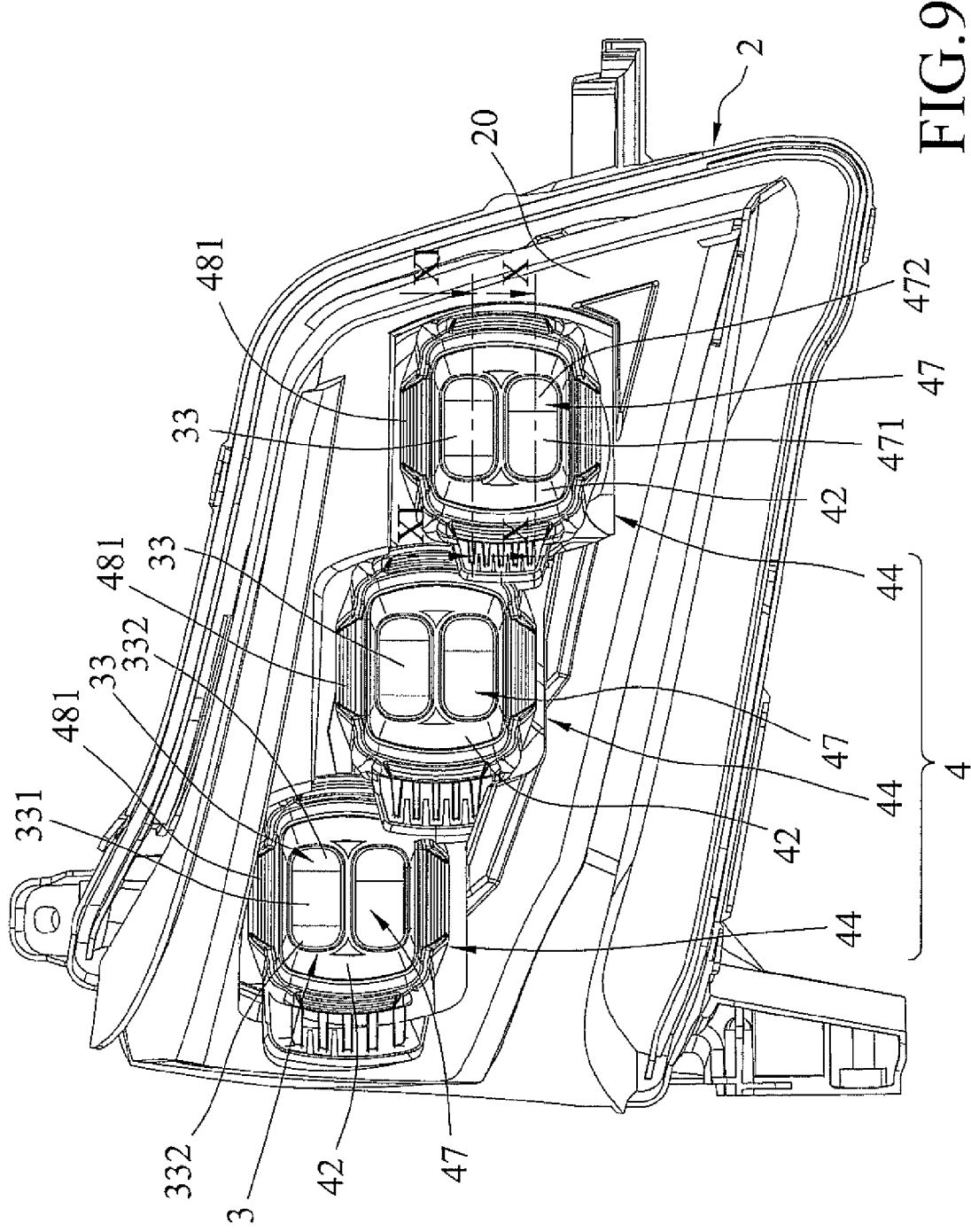
FIG. 9 is a fragmentary front view, illustrating the second preferred embodiment of a vehicle light apparatus according to the present invention.
Figure 10:
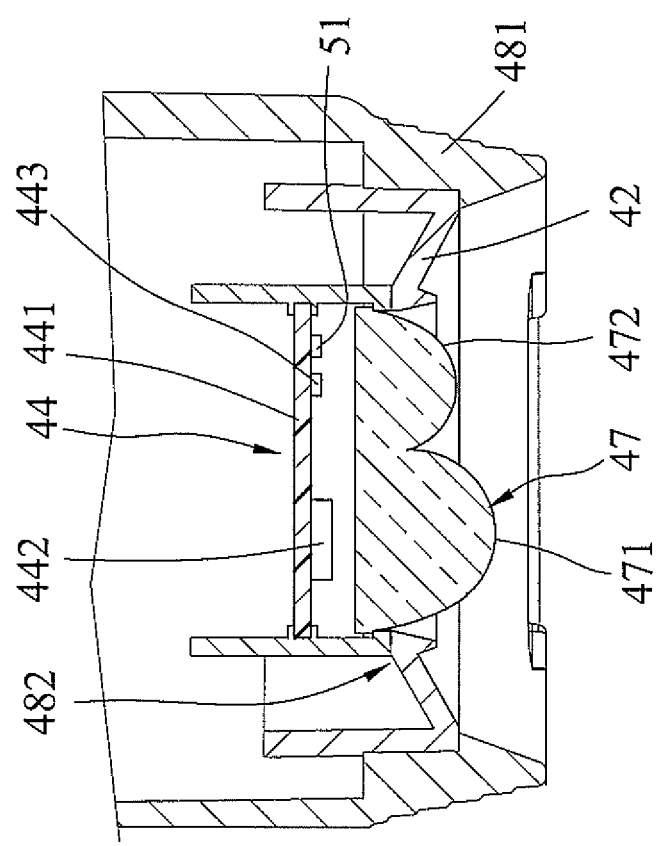
FIG. 10 is a fragmentary sectional view of the second preferred embodiment taken along the line X-X of FIG. 9.

Referring to FIGS. 6 to 8, each of the heat dissipation members 431 is disposed rearward of and in proximity to the rear open end 424 of the respective one of the reflector cups 421 (only one heat dissipation member 431 is shown in FIG. 6). The circuit board 441 of each light-emitting module 44 is disposed between the respective one of the heat dissipation members 431 and the rear open end 424 of the respective one of the reflector cups 421.

In this preferred embodiment, the composite headlight unit 4 further includes a lens member 46 that is disposed between the annular reflection seat 41 and the light mounting seat 42. The lens member 46 has a plurality of convex lens portions 461. Each of the convex lens portions 461 is disposed between a respective one of the light passages 412 of the annular reflection seat 41 and the front open end 423 of the respective one of the reflector cups 421 of the light mounting seat 42. In addition, each of the convex lens portions 461 of the lens member 46 protrudes forwardly toward the annular reflection seat 41, and has a concaved face 463 that is directed toward the respective one of the light-emitting modules 44 and a plurality of light-guiding ridges 464 that protrude from a part of the concaved face 463 and that are eccentric to a center of the concaved face 463. Each of the light-guiding ridges 464 reflects light projected from the turn signal light element 443 of the respective one of the light-emitting modules 44 in a direction laterally and outwardly from the housing cover 22. Preferably, the lens member 46 further has a connection portion 462 that interconnects the convex lens portions 461.

Referring back to FIGS. 4, 5 and 8, in actual use, by virtue of the control module 45, either the low-beam light element 32 or the high-beam light elements 442 are selectable to be turned on by a driver. When the low-beam light element 32 is turned on, the low-beam reflector 31 reflects low-beam light of the low-beam light element 32 and distributes the low-beam light to from the low-beam light pattern in compliance with relevant regulations. When the driver turns on the turn signal light elements 443 of the light-emitting modules 44, the turn signal light elements 443 of the light-emitting modules 44 emit flashing light externally surrounding the low-beam headlight unit 3. The convex lens portions 461 of the lens member 46 guide the flashing light in the form of an annular light shape so as to increase identifiability of the vehicle light apparatus.

When the high-beam light elements 442 of the light-emitting modules 44 are turned on and emit high-beam light, the convex lens portions 461 of the lens member 46 collect the high-beam light such that the high-beam light is projected outwardly from the light passages 412 of the annular reflection seat 41 and is distributed to form the high-beam light pattern in compliance with the relevant regulations. Since the light-emitting modules 44 surround the low-beam headlight unit 3, the high-beam light elements 442 of the light-emitting modules 44 provide the high-beam distribution in the form of an annular shape so as to increase identifiability of the vehicle light apparatus. When the turn signal light elements 443 of the light-emitting modules 44 are switched on, the control module 45 is operable to simultaneously turn off the high-beam light elements 442 of the light-emitting modules 44 and turn on the low-beam light element 32 in order to prevent light interference between the high-beam and turn signal light elements 442, 443 inside each of the reflector cups 421. When the turn signal light elements 443 of the light-emitting modules 44 are switched off, the control module 45 is operable to simultaneously turn on the high-beam light elements 442 of the light-emitting modules 44 and turn off the low-beam light element 32.

It should be noted that the control module 45 is operable to adjust output power of the high-beam light elements 442 of the light-emitting modules 44. When the high-beam light elements 442 of the light-emitting modules 44 are adjusted to one hundred percent of the output power, the high-beam light elements 442 of the light-emitting modules 44 provide the high-beam light distribution pattern in sufficient brightness according to the relevant regulations. When the high-beam light elements 442 of the light-emitting modules 44 are adjusted to eighty percent of the output power, the high-beam light elements 442 of the light-emitting modules 44 can serve as a daytime running light. When the high-beam light elements 442 of the light-emitting modules 44 are adjusted to ten percent of the output power, the low-beam light element 32 which has a relatively low output power and the high-beam light elements 442 of the light-emitting modules 44 cooperatively serve as a front position light. By virtue of the control module 45 adjusting the output power of the high-beam light elements 442 of the light-emitting modules 44, the vehicle light apparatus is capable of providing different brightness levels.

In this embodiment, since the light-emitting modules 44 surround the low-beam headlight unit 3, and the high-beam and turn signal light elements 442, 443 of the light-emitting modules 44 provide different beam patterns, the vehicle light apparatus not only provides different light beam patterns to increase identifiability, but also has a relatively small size.

FIGS. 9 to 12 show the second preferred embodiment of a vehicle light apparatus according to this invention. In this embodiment, each of the light-emitting modules 44 further includes a sub-housing 481, a first lens barrel 482 disposed inside the sub-housing 481, and a first lens 47 disposed inside the first lens barrel 482. The circuit board 441 is mounted inside the first lens barrel 482 and rearward of the first lens 47. The first lens 47 has a first curved surface 471 that is aligned with the high-beam light element 442, and a second curved surface 472 that is aligned with the turn signal light element 443 and that is side by side adjacent to the first curved surface 471. In this preferred embodiment, the first lens barrel 482 can be used as a heat sink. The first curved surface 471 has a curvature that is different from that of the second curved surface 472.

Figure 11:
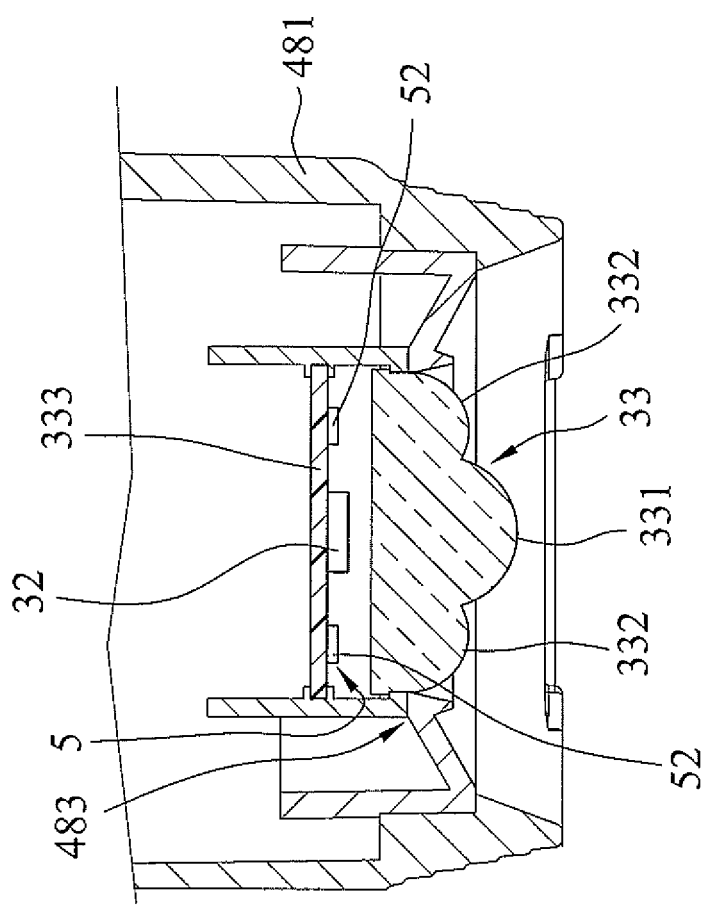
FIG. 11 is a fragmentary sectional view of the second preferred embodiment taken along the line XI-XI of FIG. 9.
Figure 12:
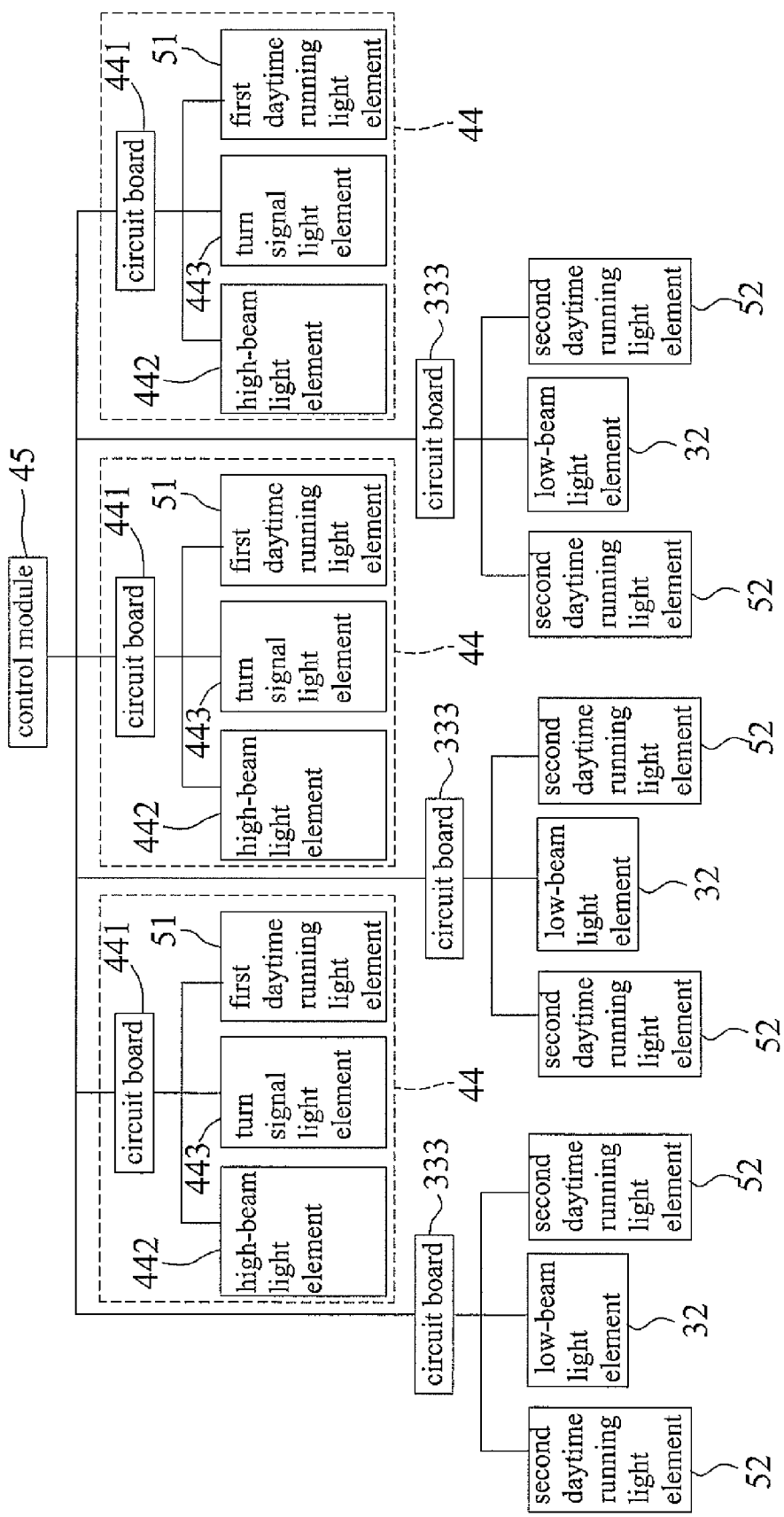
FIG. 12 is a schematic block diagram to illustrate operation of a control module of the second preferred embodiment.

In this preferred embodiment, the low-beam headlight unit 3 includes a plurality of second lens barrels 483 (only one is shown in FIG. 11) respectively disposed inside the sub-housings 481 of the light-emitting modules 44, a plurality of second lenses 33 respectively disposed inside the second lens barrels 483, and a plurality of low-beam light elements 32 each of which is disposed inside a respective one of the second lens barrels 483 rearward of a respective one of the second lenses 33. Each of the second lenses 33 of the low-beam headlight unit 3 has a third curved surface 331 that is aligned with the respective one of the low-beam light elements 32, and at least one fourth curved surface 332 that is side by side adjacent to the third curved surface 331. In this preferred embodiment, each of the second lenses 33 has two fourth curved surfaces 332 that are respectively connected to two opposite end portions of the third curved surface 331. The third curved surface 331 has a curvature that is different from that of the fourth curved surfaces 332. Preferably, the low-beam headlight unit 3 further has a plurality of circuit boards 333 that are respectively disposed inside the second lens barrels 483. The low-beam light elements 32 are respectively mounted on the circuit boards 333 of the low-beam headlight unit 3. However, the present invention is not limited in this respect. For example, the circuit boards 333 of the low-beam headlight unit 3 and the circuit boards 441 of the light-emitting module 44 can be integrally formed with each other as a single circuit board.

In this preferred embodiment, the vehicle light apparatus further includes a plurality of daytime running light units 5 (only one is shown in FIG. 11) each of which includes a first daytime running light element 51 that is mounted on the circuit board 441 of a respective one of the light-emitting modules 44. The first daytime running light element 51 of each of the daytime running light units 5 and the turn signal light element 443 of the respective one of the light-emitting modules 44 are aligned with the second curved surface 472 of the first lens 47 of the respective one of the light-emitting modules 44. The first daytime running light units 5 are electrically coupled to the control module 45. Preferably, each of the daytime running light units 5 further includes a second daytime running light element 52 that is disposed inside a respective one of the second lens barrels 483 and that is aligned with the fourth curved surface 332 of the respective one of the second lenses 33. In this preferred embodiment, each of the daytime running light units 5 includes two second daytime running light elements 52 that are disposed in proximity to two sides of a respective one of the low-beam light elements 32 and that are mounted on the respective one of the circuit boards 333 inside the respective one of the second lens barrels 483.

By virtue of the third curved surfaces 331 of the second lenses 33 reflecting the low-beam light of the low-beam light elements 32, the low-beam light elements cooperatively provide the low-beam distribution pattern. By virtue of the first curved surfaces 471 of the first lenses 47 reflecting the high-beam light of the high-beam light elements 442 of the light-emitting modules 44, the high-beam light elements 442 of the light-emitting modules 44 cooperatively provide the high-beam distribution pattern. By virtue of the second surfaces 472 of the first lenses 47 reflecting light of the turn signal light elements 443 of the light-emitting modules 44, the turn signal light elements 443 of the light-emitting modules 44 cooperatively provide the turn signal distribution pattern.

Preferably, in addition to the advantages of the first preferred embodiment, the daytime running light units 5 of the second preferred embodiment are capable of being turned on at any time so as to increase driving safety in day time.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A vehicle light apparatus comprising:
   a main housing having a receiving space;
   a low-beam headlight unit mounted in said receiving space to provide a low-beam distribution pattern; and
   a composite headlight unit including
      a plurality of light-emitting modules that are mounted in said receiving space, each of said light-emitting modules including a high-beam light element and a turn signal light element, said high-beam light elements of said light-emitting modules providing a high-beam distribution pattern, said turn signal light elements of said light-emitting modules providing a turn signal distribution pattern, and
      a control module that is electrically coupled to said light-emitting modules and said low-beam headlight unit so as to simultaneously turn off said high-beam light elements and turn on said low-beam headlight unit when said turn signal light elements are switched on;
   wherein each of said light-emitting modules further includes a circuit board disposed in said receiving space and electrically coupled to said control module, said high-beam and turn signal light elements being mounted on said circuit board;
   wherein said composite headlight unit further includes a heat sink unit that includes a plurality of heat dissipation members, said heat dissipation members contacting respectively said circuit boards of said light-emitting modules;
   wherein said composite headlight unit further includes a light mounting seat that has a plurality of reflector cups disposed around said low-beam headlight unit, and an annular reflection seat that is disposed in front of said light mounting seat and that has a plurality of light passages which are respectively aligned with said reflector cups, said high-beam and turn signal light elements of each of said light-emitting modules being disposed in a respective one of said reflector cups;
   wherein each of said reflector cups has a cup wall that has a front open end proximate to said annular reflection seat, and a rear open end distal from said annular reflection seat, and high-beam and turn signal light elements of each of said light-emitting modules being disposed in said rear open end of the respective one of said reflector cups;
   wherein said high-beam light element of each of said light-emitting modules is disposed at a center of said rear open end of the respective one of said reflector cups, said turn signal light element of each of said light-emitting modules being offset from the center of said rear open end; and
   wherein each of said reflector cups of said light mounting seat further has a reflector prism are that protrudes from an inner surface of said cup wall around said turn signal light element of the respective one of said light-emitting modules.

2. The vehicle light apparatus as claimed in claim 1, wherein each of said heat dissipation members is disposed rearward of and in proximity to said rear open end of the respective one of said reflector cups, said circuit board being disposed between the respective one of said heat dissipation members and said rear open end of a respective one of said reflector cups.

3. The vehicle light apparatus as claimed in claim 1, wherein said annular reflection seat of said composite headlight unit further has an annular body that defines a hollow region, said light passages surrounding said hollow region, said low-beam headlight unit including a low-beam reflector and a low-beam light elements said low-beam reflector having an annular reflective wall that defines a reflective space receiving said low beam light element and that is aligned with said hollow region.

4. The vehicle light apparatus as claimed in claim 1, wherein said light mounting seat of said composite headlight unit further has a connection plate that extends around said low-beam headlight unit and that interconnects said reflector cups.

5. The vehicle light apparatus as claimed in claim 1, wherein said control module is operable to adjust output power of said high-beam light elements of said light-emitting modules.

6. The vehicle light apparatus as claimed in claim 1, wherein each of said light-emitting modules further includes a sub-housing, a first lens barrel disposed inside said sub-housing, and a first lens disposed inside said first lens barrel, said circuit board being mounted inside said first lens barrel and rearward of said first lens.

7. The vehicle light apparatus as claimed in claim 6, wherein said low-beam headlight unit includes a plurality of second lens barrels respectively disposed inside said sub-housings of said light-emitting modules, a plurality of second lenses respectively disposed inside said second lens barrels, and a plurality of low-beam light elements each of which is disposed inside a respective one of said second lens barrels rearward of a respective one of said second lenses.

8. The vehicle light apparatus as claimed in claim 7, wherein said first lens has a first curved surface that is aligned with said high-beam light element, and a second curved surface that is aligned with said turn signal light element and that is side by side adjacent to said first curved surface, each of said second lenses of said low-beam headlight unit having a third curved surface that is aligned with a respective one of said low-beam light elements, and at least one fourth curved surface that is side by side adjacent to said third curved surface.

9. The vehicle light apparatus as claimed in claim 1, wherein said composite headlight unit further includes a lens member that is disposed between said annular reflection seat and said light mounting seat, said lens member having a plurality of convex lens portions, each of said convex lens portions being disposed between a respective one of said light passages of said annular reflection seat and a respective one of said reflector cups of said light mounting seat.

10. The vehicle light apparatus as claimed in claim 9, wherein each of said convex lens portions of said lens member protrudes forwardly toward said annular reflection seat, and has a concaved face that is directed toward a respective one of said light-emitting modules and a plurality of light-guiding ridges that protrude from a part of said concaved face and that are eccentric to a center of said concaved face.

11. The vehicle light apparatus as claimed in claim 9, wherein said lens member further has a connection portion that interconnects said convex lens portions.

* * * * *